T. F. BARNES.
SKIN STRETCHER.
APPLICATION FILED NOV. 22, 1917.

1,271,418.

Patented July 2, 1918.
2 SHEETS—SHEET 1.

WITNESSES
James F. Crown,
Wm Zeaman

INVENTOR
Tomie F Barnes,
BY Richard Owen,
ATTORNEY

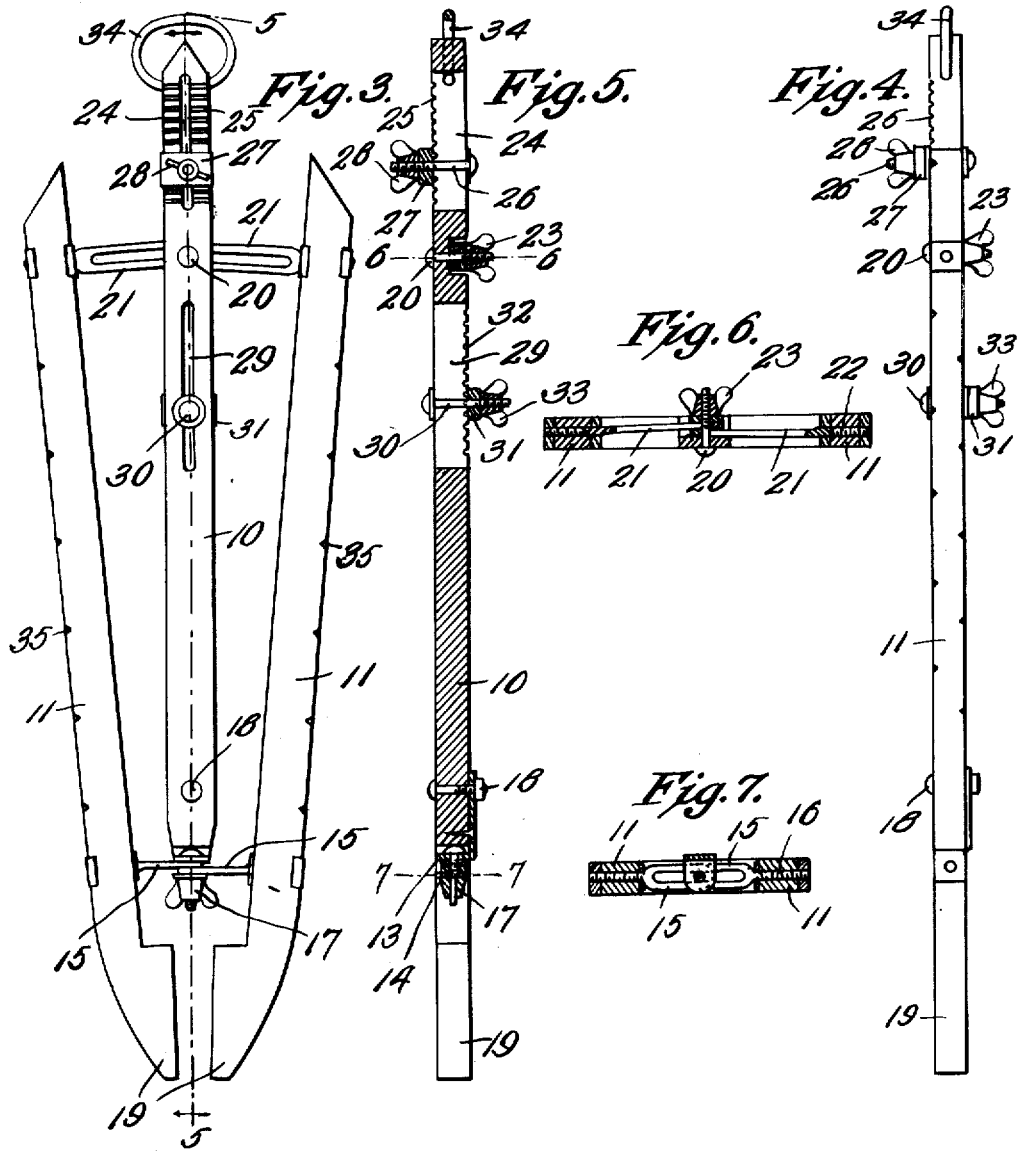

UNITED STATES PATENT OFFICE.

TOMIE F. BARNES, OF HUGO, OKLAHOMA.

SKIN-STRETCHER.

1,271,418.

Specification of Letters Patent.

Patented July 2, 1918.

Application filed November 22, 1917. Serial No. 203,427.

*To all whom it may concern:*

Be it known that I, TOMIE F. BARNES, a citizen of the United States, residing at Hugo, in the county of Choctaw and State of Oklahoma, have invented certain new and useful Improvements in Skin-Stretchers, of which the following is a specification.

This invention has relation to the art of dressing and curing animal skins, and has for an object to provide a device to be inserted within the treated skin of an animal to stretch the same and to retain its shape during drying thereof.

Another object of the invention is to provide a device for the purpose above set forth embodying relatively movable members with means for clamping the members in any adjusted position whereby they may be inserted within the skin of an animal and separated while inserted therein to stretch the skin whereby it may be dried and its shape retained.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Fig. 3, is a view of the device in rear elevation.

Fig. 4, is a view of the same in edge view.

Fig. 5, is a longitudinal sectional view taken through the device on the line 5—5 of Fig. 3.

Fig. 6, is a detail section taken on the line 6—6 of Fig. 5, and

Fig. 7, is a similar view taken on the line 7—7 of Fig. 5.

Figure 1:
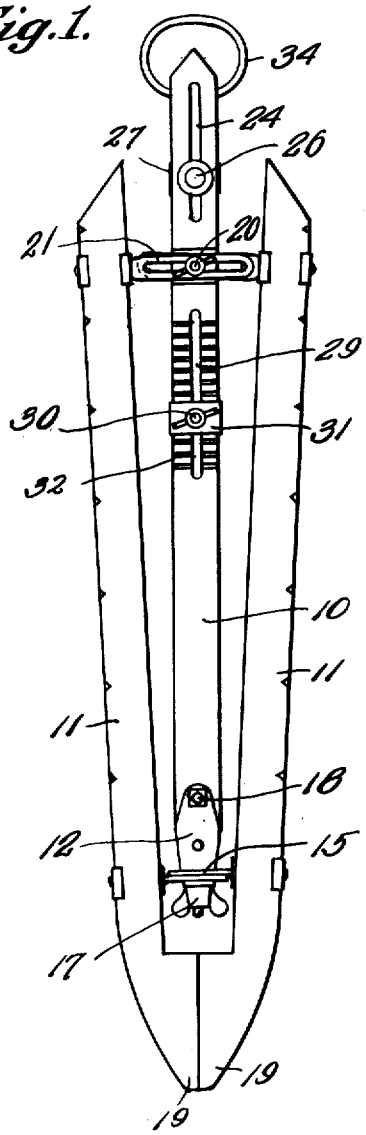
Figure 1, is a view of my skin stretching device in front elevation with the parts in collapsed position.
Figure 2:
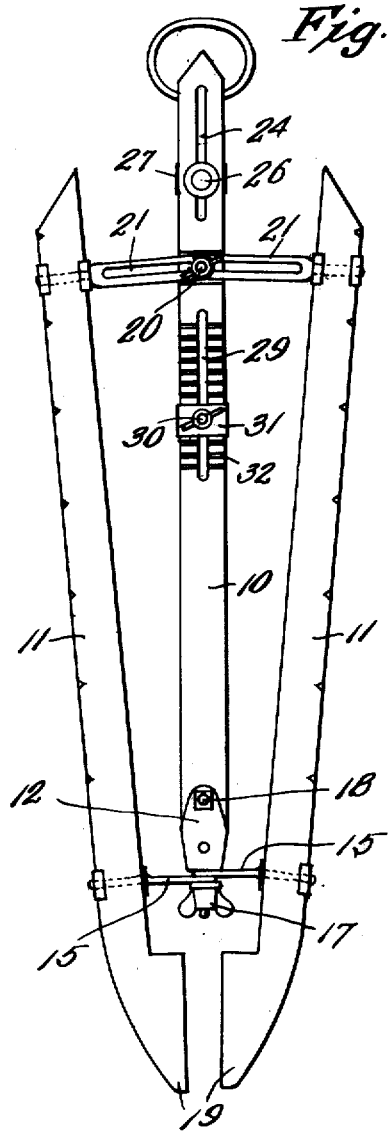
Fig. 2, is a view similar to the preceding with the parts in separated relation.

With reference to the drawings 10 indicates a central member in the form of a bar and 11 indicates a pair of stretcher members in contiguous relation to the central member, one disposed at each side thereof, for movement toward and away from the central member.

Mounted upon the lower end of the central member is an angular plate 12 having one side bolted to one side of the member 10, and the other side of the plate indicated at 13 extending across the end of the bar and apertured to receive a longitudinally extending bolt 14. A pair of slotted braces 15 are provided, each having one end formed with a tang 16 threaded and inserted through openings in the members 11, said slotted braces 15 being directed toward each other and extending from the inner edges of the stretcher members 11 to receive therewithin the bolt 14 which penetrates both braces. A nut 17 is subsequently applied to the bolt to bind the braces together and to secure the lower ends of the stretcher members 11 against relative movement subsequent to adjustment. A bolt 18 is provided to secure the plate 12 in place.

The lower ends of the stretcher members are enlarged as at 19 and their outer edges are curved toward each other to form a nose.

The opposite or upper end of the central bar 10 is apertured to receive a transversely extending bolt 20 which penetrates a pair of slotted braces 21 similar to the braces 15, the former having in a similar manner threaded tangs 22 to enter openings in the stretcher members 11 and to extend from the inner edges thereof toward each other. A thumb nut 23 is applied to the bolt to clamp the braces 21 together to prevent relative movement of the upper edge of the stretcher members 11. It will be noted that the braces 21 are slightly longer than the braces 15 in order to dispose the stretcher members 11 in downwardly converging relation.

The upper terminal of the central bar 10 is formed with a longitudinally extending slot 24, and one side of the bar adjacent the slot is serrated as at 25. A bolt 26 penetrates the slot and also a clamping block 27 having its under side serrated to conform to the serrations 25, a thumb nut 28 being applied to the bolt to engage the block to securely clamp the same against the bar. The bar 10 is also provided with a second slot 29 extending longitudinally thereof and formed at a point intermediate the ends of the bar to receive a clamping bolt 30 which also penetrates the clamping block 31 in this instance however, engaging the side of the bar 10 opposite that side engaged by the above mentioned block 27. The side of the bar 10 engaged by the block 31 is serrated as at 32 to interengagement with the serrations formed upon the under surface of the block. A winged nut 33 is applied to the bolt 30 to clamp the block 31 against the block 10.

When using my device the skin is removed from the animal without splitting the skin, and the device is inserted small end first, the device being pushed toward the head of the animal. Prior to introducing the device into the skin, the nut 17 is loosened and the lower end of the members 11 are projected relatively so as to permit the insertion of the device into the skin and to permit it to extend through the mouth. The nuts 23 at the upper end of the device are then loosened and the upper ends of the stretcher members are moved relatively or separated so as to stretch the skin and the nuts then tightened. The hind legs of the skin are overlapped and secured beneath the block 31, while the tail is stretched and secured beneath the block 27. A ring 34 is provided upon the upper end of the bar 10 whereby the device may be suspended.

It will thus be seen that I have provided a device which is so adjustable as to permit skins of various sizes to be stretched thereon, the block 27 being adjustable longitudinally of the bar so as to permit the tail to be secured thereto, and likewise the block 31 to secure the hind legs of the skin. The outer edges of the stretcher members 11 may be formed with notches if desired as indicated at 35 to insure frictional contact with the skin to prevent the same from slipping.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. A device of the character described, including a central bar, a pair of stretcher bars one at each side thereof, means for adjustably connecting the stretcher bar to the center bar for movement toward or away therefrom, and a plurality of clamping means on the center bar.

2. A device of the character described, including a center bar, a pair of stretcher bars, one at each side thereof in contiguous relation, braces at each end of each stretcher bar directed toward each other, means for adjustably clamping the braces together and upon the center bar, and a plurality of clamping blocks upon the center bar.

3. A device of the character described including a center bar, a pair of stretcher bars one at each side of the center bar in contiguous relation thereto, a slotted brace at each end of each stretcher bar, said braces directed toward each other, and a pair of bolts on said center bar entering the slotted braces whereby the braces may be clamped together and to the center bar.

4. In a device of the character described including a center bar, a pair of stretcher bars one at each side thereof, means for adjustably connecting the stretcher bars and the center bar for movement toward and away therefrom, said center bar having a pair of longitudinally extending slots, bolts passing through said slots, clamping bars having apertures to receive the bolts, and thumb screws applied to the bolts to clamp the blocks to the bar.

5. A device of the character described including a center bar, having a pair of longitudinally extending slots in alinement, opposite sides of the bar adjacent the slots being serrated, a bolt entering each slot, a block apertured to receive the bolt and applied to one serrated side of the bar, a second block applied to the other bolt to engage the opposite side of the bar and thumb screws applied to the bolts to clamp the blocks beneath the bar.

In testimony whereof I affix my signature in presence of two witnesses.

TOMIE F. BARNES.

Witnesses:
  H. C. HOLT,
  CLAUD KIMMONS.